US008693659B2

(12) United States Patent
Lyman

(10) Patent No.: US 8,693,659 B2
(45) Date of Patent: Apr. 8, 2014

(54) SYSTEM AND METHOD FOR CENTRALIZED PRESENCE MANAGEMENT OF LOCAL AND REMOTE USERS

(75) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 1340 days.

(21) Appl. No.: 11/827,314

(22) Filed: Jul. 11, 2007

(65) Prior Publication Data

US 2008/0219423 A1     Sep. 11, 2008

Related U.S. Application Data

(60) Provisional application No. 60/906,024, filed on Mar. 9, 2007.

(51) Int. Cl.
*H04M 3/42* (2006.01)

(52) U.S. Cl.
USPC ..................................... 379/201.1; 379/88.17

(58) Field of Classification Search
USPC ............... 379/88.17, 201.01, 201.02, 201.04, 379/201.1, 265.09; 726/4, 17, 27; 709/206, 709/207
See application file for complete search history.

(56) References Cited

U.S. PATENT DOCUMENTS

| | | | |
|---|---|---|---|
| 4,653,090 A | 3/1987 | Hayden | |
| 5,533,110 A | 7/1996 | Pinard et al. | |
| 5,754,636 A | 5/1998 | Bayless et al. | |
| 5,854,834 A | 12/1998 | Gottlieb et al. | |
| 5,940,488 A | 8/1999 | DeGrazia et al. | |
| 6,104,711 A | 8/2000 | Voit | |
| 6,137,869 A | 10/2000 | Voit | |
| 6,282,574 B1 | 8/2001 | Voit | |
| 6,359,880 B1 | 3/2002 | Curry | |
| 6,389,132 B1 | 5/2002 | Price | |
| 6,400,719 B1 | 6/2002 | Chimura et al. | |
| 6,418,214 B1 | 7/2002 | Smythe et al. | |
| 6,430,275 B1 | 8/2002 | Voit | |
| 6,430,289 B1 | 8/2002 | Liffick | |
| 6,453,038 B1 | 9/2002 | McFarlane et al. | |
| 6,628,765 B1 | 9/2003 | Bangs et al. | |
| 6,718,030 B1 | 4/2004 | Turner et al. | |
| 6,782,412 B2 | 8/2004 | Brophy et al. | |
| 6,820,083 B1 | 11/2004 | Nagy et al. | |
| 6,937,703 B1 | 8/2005 | Andreason | |

(Continued)

FOREIGN PATENT DOCUMENTS

| | | |
|---|---|---|
| WO | 2004049121 A2 | 6/2004 |
| WO | 2005036330 A2 | 4/2005 |
| WO | 2006020168 A2 | 2/2006 |

OTHER PUBLICATIONS

Inter-Tel, Inc. "Advanced Applications Design Guide for Contact Center Suite." Issue 1. Apr. 2006.

(Continued)

*Primary Examiner* — Antim Shah
(74) *Attorney, Agent, or Firm* — Carr & Ferrell LLP

(57) ABSTRACT

Systems and methods for centralized presence management of local and remote users are provided. In exemplary embodiments, presence management information for the local and remote users are determined. Permissions established for at least one presence management user are reviewed to determine an amount of access to the presence management information to provide to the presence management user. The presence management information is then provided to the presence management user based on the permissions.

20 Claims, 11 Drawing Sheets

(56) References Cited

U.S. PATENT DOCUMENTS

| | | |
|---|---|---|
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 | 8/2006 | Mears et al. |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,274,781 B2 | 9/2007 | Lipton et al. |
| 7,333,976 B1 | 2/2008 | Auerbach et al. |
| 7,477,730 B2 | 1/2009 | Starbuck et al. |
| 7,496,185 B1 | 2/2009 | Primavesi et al. |
| 7,496,189 B2 | 2/2009 | Clarisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,664,096 B2 | 2/2010 | Doherty et al. |
| 7,664,495 B1 | 2/2010 | Bonner et al. |
| 7,685,010 B2 | 3/2010 | Goldberg et al. |
| 7,706,522 B2 | 4/2010 | Shaffer |
| 7,711,104 B1 | 5/2010 | Flockhart |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 * | 7/2011 | Croak et al. ............. 379/142.04 |
| 8,131,872 B2 | 3/2012 | Kennedy et al. |
| 8,132,001 B1 | 3/2012 | Patten et al. |
| 8,223,941 B2 | 7/2012 | White et al. |
| 8,379,832 B1 | 2/2013 | Lyman |
| 8,571,202 B2 | 10/2013 | Lyman |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0026414 A1 | 2/2003 | Baker et al. |
| 2003/0078986 A1 | 4/2003 | Ayres et al. |
| 2003/0219029 A1 | 11/2003 | Pickett |
| 2003/0228010 A1 | 12/2003 | Clarisse et al. |
| 2004/0001573 A1 * | 1/2004 | Gusler et al. ................. 379/67.1 |
| 2004/0039889 A1 | 2/2004 | Elder et al. |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 | 5/2004 | Wick |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gusler et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 | 8/2006 | Song |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto |
| 2006/0256942 A1 | 11/2006 | Gatzke et al. |
| 2006/0288099 A1 * | 12/2006 | Jefferson et al. ............... 709/224 |
| 2007/0011337 A1 | 1/2007 | Brown et al. |
| 2007/0061197 A1 | 3/2007 | Ramer et al. |
| 2007/0078708 A1 | 4/2007 | Yu et al. |
| 2007/0165640 A1 | 7/2007 | Fitchett et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2010/0174807 A1 | 7/2010 | Lyman |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2012/0266080 A1 | 10/2012 | Zellner et al. |
| 2013/0022038 A1 | 1/2013 | Cadiz et al. |
| 2013/0108035 A1 | 5/2013 | Lyman |
| 2013/0148800 A1 | 6/2013 | Lyman |
| 2013/0243181 A1 | 9/2013 | Sirstins et al. |

OTHER PUBLICATIONS

"Enhanced Enterprise Communication: Transforming the bank into a proactive relationship center."
"Network Intelligence for Presence Enhanced Communication."
"Presence Aggregation in Endpoints."
Hull, et al., Enabling Context-Aware and Privacy-Conscious User Data Sharing, 2004, Proceedings of the 2004 IEEE International Conference on Mobile Data Management.

(56) References Cited

OTHER PUBLICATIONS

Broder, et al., Search Advertising Using Web Relevance Feedback, 2008, pp. 1013-1022, Conference on Information and Knowledge Management, Proceeding of the 17th AC conference on Information and Knowledge Management.

"What is Xact View?" Xact View User Guide, Schmooze Communications LLC 2008. www.schmooze.com.

Notice of Allowance mailed Sep. 2, 2011 in U.S. Appl. No. 12/069,083, filed Feb. 6, 2008.

Office Action mailed Oct. 18, 2011 in U.S. Appl. No. 11/800,302, filed May 3, 2007.

Office Action mailed Oct. 31, 2011 in U.S. Appl. No. 12/075,401, filed Mar. 10, 2008.

Office Action mailed Nov. 7, 2011 in U.S. Appl. No. 12/228,301, filed Aug. 11, 2008.

Office Action mailed Oct. 21, 2011 in U.S. Appl. No. 12/319,693, filed Jan. 8, 2009.

Final Office Action, Jan. 26, 2012, U.S. Appl. No. 11/506,279, filed Aug. 17, 2006.

Non-Final Office Action, Mar. 13, 2013, U.S. Appl. No. 11/506,279, filed Aug. 17, 2006.

Final Office Action, Aug. 13, 2013, U.S. Appl. No. 11/506,279, filed Aug. 17, 2006.

Non-Final Office Action, May 22, 2012, U.S. Appl. No. 11/800,302, filed May 3, 2007.

Notice of Allowance, Dec. 10, 2012, U.S. Appl. No. 11/800,302, filed May 3, 2007.

Notice of Allowance, Jun. 13, 2012, U.S. Appl. No. 12/075,411, filed Mar. 10, 2008.

Non-Final Office Action, Apr. 19, 2012, U.S. Appl. No. 12/075,402, filed Mar. 10, 2008.

Notice of Allowance, Mar. 8, 2013, U.S. Appl. No. 12/075,402, filed Mar. 10, 2008.

Advisory Action, Feb. 15, 2012, U.S. Appl. No. 12/075,401, filed Mar. 10, 2008.

Non-Final Office Action, Jun. 20, 2012, U.S. Appl. No. 12/075,401, filed Mar. 10, 2008.

Notice of Allowance, Mar. 4, 2013, U.S. Appl. No. 12/075,401, filed Mar. 10, 2008.

Final Office Action, Aug. 30, 2012, U.S. Appl. No. 12/228,301, filed Aug. 11, 2008.

Non-Final Office Action, Apr. 9, 2013, U.S. Appl. No. 12/228,301, filed Aug. 11, 2008.

Final Office Action, Oct. 8, 2013, U.S. Appl. No. 12/228,301, filed Aug. 11, 2008.

Final Office Action, May 17, 2012, U.S. Appl. No. 12/319,693, filed Jan. 8, 2009.

Non-Final Office Action, May 21, 2013, U.S. Appl. No. 12/319,693, filed Jan. 8, 2009.

Final Office Action, Oct. 7, 2013, U.S. Appl. No. 12/319,693, filed Jan. 8, 2009.

Final Office Action, Jan. 4, 2012, U.S. Appl. No. 12/405,197, filed Mar. 16, 2009.

Non-Final Office Action, Sep. 5, 2013, U.S. Appl. No. 12/405,197, filed Mar. 16, 2009.

Non-Final Office Action, Feb. 1, 2012, U.S. Appl. No. 12/405,204, filed Mar. 16, 2009.

Non Final Office Action, Dec. 6, 2012, U.S. Appl. No. 12/405,204, filed Mar. 16, 2009.

Non Final Office Action, May 24, 2013, U.S. Appl. No. 13/213,020, filed Aug. 18, 2011.

Non Final Office Action, May 7, 2013, U.S. Appl. No. 13/738,841, filed Jan. 10, 2013.

Notice of Allowance, Aug. 15, 2013, U.S. Appl. No. 13/738,841, filed Jan. 10, 2013.

* cited by examiner

SYSTEM AND METHOD FOR CENTRALIZED PRESENCE MANAGEMENT OF LOCAL AND REMOTE USERS

CROSS-REFERENCE TO RELATED APPLICATIONS

The present application claims priority benefit of U.S. Provisional Patent Application No. 60/906,024 filed Mar. 9, 2007, and entitled "Real-Time Call Management System," which is hereby incorporated by reference. The present application is also related to U.S. Nonprovisional patent application Ser. No. 12/075,401 filed Mar. 10, 2008, issued as U.S. Pat. No. 8,499,246 on Jul. 30, 2013, entitled "System and Method for Providing Single Click Enterprise Communication," which also claims priority to U.S. patent application Ser. No. 60/906,024 filed Mar. 9, 2007, and entitled "Real-Time Call Management System."

BACKGROUND OF THE INVENTION

1. Field of the Invention

Embodiments of the present invention relate generally to presence management and more particularly to centralized presence management of local and remote users.

2. Description of Related Art

Often time, users want to know the status of fellow users in a working environment. This may be especially important in a call center or customer service department where calls need to be queued up for a next available agent (i.e., user). Additionally, employers may be interested in seeing and verifying productivity of their employees.

Conventionally, software applications that allow a user to monitor phone status (i.e., presence) of local users exist. Typically, the local users all access phone calls via a PBX system that can provide the status. However, these conventional software applications are directed only to monitoring the status of phone calls. Other communication means, such as chat, cannot be monitored via these conventional software applications.

Presently, many individuals work at least part time from their homes. While conventional software applications allow for monitoring of local telephone use, these software applications cannot be applied to monitoring remote users.

As a result of the above mention problems, there is a need for a system that can monitor both local and remote users within a single homogenous system.

SUMMARY OF THE INVENTION

Embodiments of the present invention provide systems and methods for centralized presence management of local and remote users. In exemplary embodiments, presence management information for the local and remote users is determined. The presence management information may comprise availability and status of the local and remote users for various communications. These communications comprise telephone calls to a desk or cell phone as well as chat.

Permissions established for at least one presence management user are reviewed to determine an amount of access to the presence management information to provide to the presence management user for each local and remote user. The permissions may be established from a group of one or more presence management users and comprise access permission as well as functionality permissions allowed the presence management user. In some embodiments, the permissions may be administered via a web-based permissions interface. The permissions may, in these embodiments, be copied to a local presence management server.

The presence management information is then provided to the presence management user based on the permissions. The presence management information may be organized within a single graphical user interface, which presents both local and remote user presence management information.

DETAILED DESCRIPTION OF EXEMPLARY EMBODIMENTS

Embodiments of the present invention provide systems and methods for centrally managing the presence of local and remote users. In exemplary embodiments, a centralized server determines and provides statuses for local and remote users. The statuses include, for example, availability for phone calls, e-mail, cell phone calls, and chat.

Figure 1:
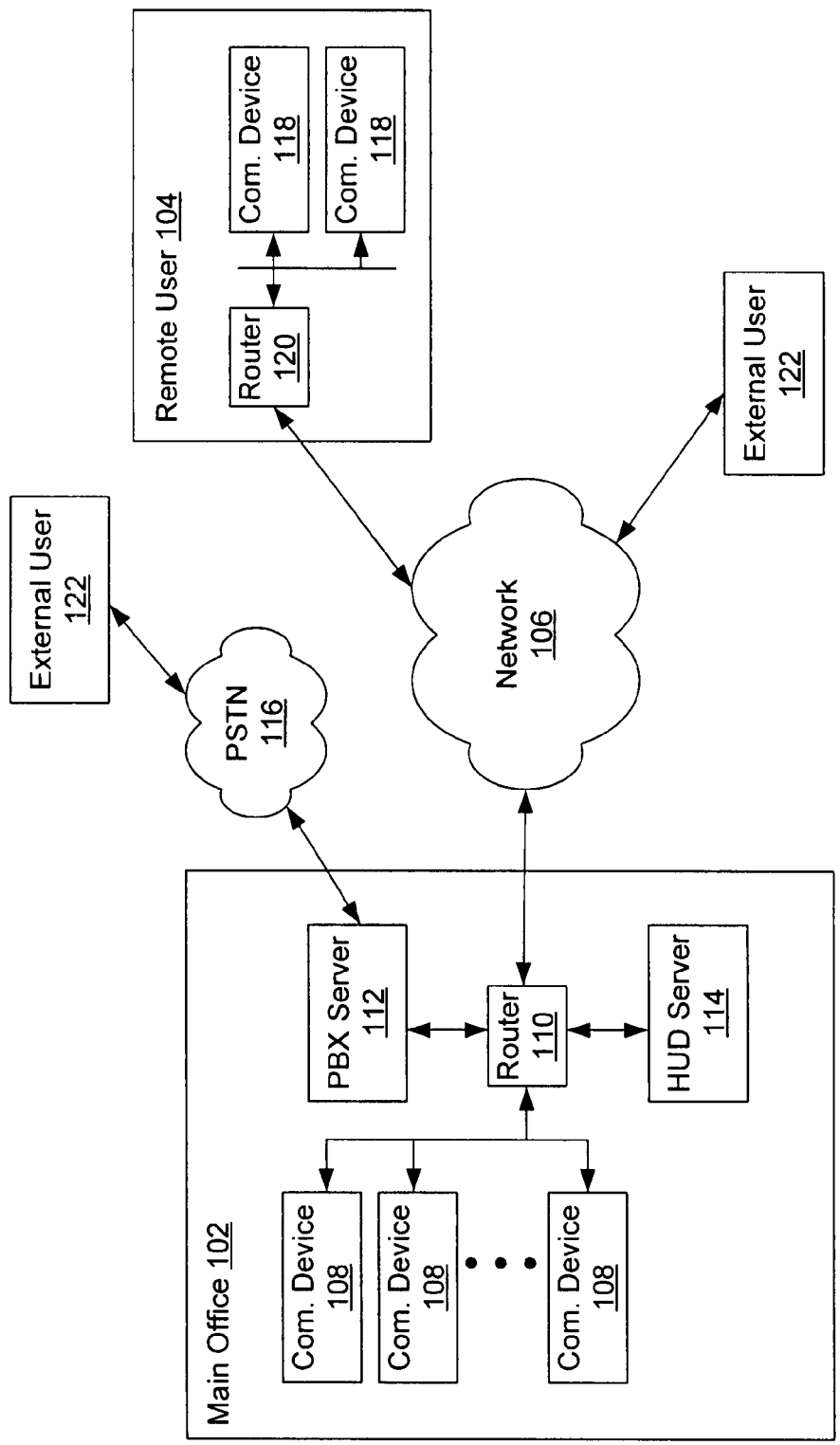
FIG. 1 is a diagram of an exemplary environment in which embodiments of the present invention may be practiced.

FIG. 1 shows an exemplary environment 100 in which embodiments of the present invention may be practiced. The exemplary environment 100 comprises a main office 102 and a remote user 104 coupled in communication via a network 106. The network 106 may comprise the Internet or any other wide area network. In exemplary embodiments, the network 106 also couples the main office 102 to external users 122. In some embodiments, the external users 122 may comprise clients or customers of the main office 102. In further embodiments, the external users 122 are accessing a customer service center (e.g., call center) associated with the main office 102.

The main office 102 comprises a plurality of communication devices 108 coupled via a router 110 or hub to a PBX system 112 and/or a head-up display (HUD) server 114. Each communication device 108 is associated with a local user. The PBX server 112 allows the communication devices 108 to make phone calls via a PSTN 116 to external users 122. The HUD server 114 enables chat messaging and provides user status, as will be discussed in more detail in connection with FIG. 3. In exemplary embodiments, the PBX server 112 and the HUD server 114 may be comprised within a single communication server device. In alternative embodiments, the PBX server 112 and the HUD server 114 may be embodied on different server devices.

The remote user 104 is any individual associated with the main office 102 (e.g., employee) which is accessing the main office 102 externally. For example, the remote user 104 may be working from a home office. The remote user 104 may have one or more communication devices (i.e., remote communication device 118) at their remote location. These remote communication devices 118 may be identical or similar to the communication devices 108 located at the main office 102. In some embodiments, the remote communication device 118 may access the main office 102 via a remote router 120. It should be noted that "remote" as used herein refers to any environment external to the main office 102.

In exemplary embodiments, the communication devices 108 and 118 comprises any devices that are enabled for communication, such as a desktop computer, a laptop, an analog phone, a cellular phone, or an IP phone. To simplify discussion, the following detailed description will focus on embodiments in which the communication devices 108 and 118 are computers and telephones.

It should be noted that the embodiment of FIG. 1 is exemplary. Alternative embodiments may comprise any number of main offices 102, remote users 104, communication devices 108 and 118, and external users 122 coupled in communication.

Figure 2:
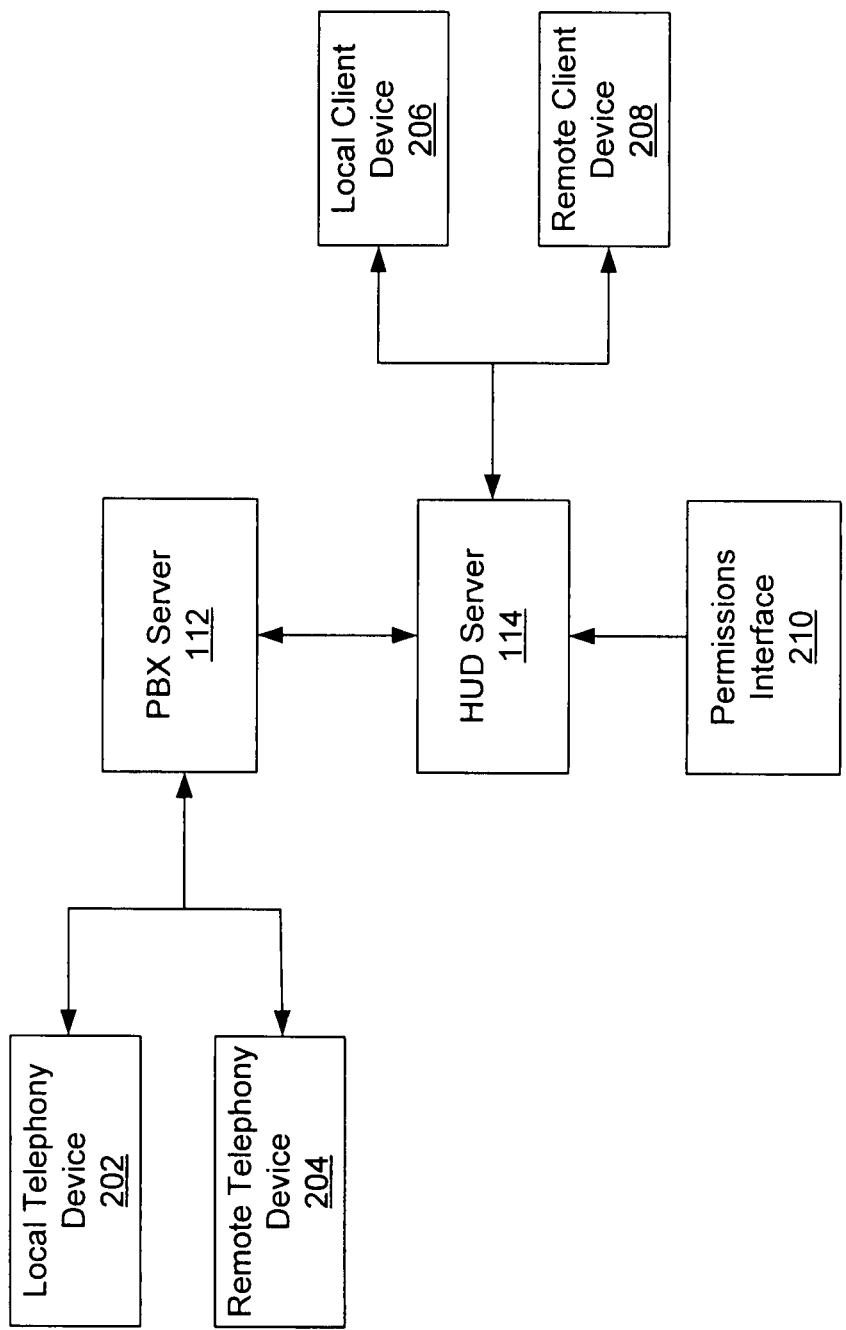
FIG. 2 is a diagram of exemplary communication paths within the environment of FIG. 1.

Referring now to FIG. 2, exemplary communication paths within the environment 100 are shown. In exemplary embodiments, a plurality of local and remote telephony devices 202 and 204 are coupled in communication with the PBX server 112. As such, calls made by the local or remote telephony device 202 and 204 may be directed through the PBX server 112. For local telephony devices 202, the telephony device 202 (e.g., analog phone or IP phone) may be directly coupled to the PBX server 112, or the telephony device 202 (e.g., an IP phone) may be coupled to the PBX server 112 via the router 110 or hub.

In some embodiments, the remote telephony device 204 comprises an IP telephone (e.g., digital phone). In these embodiments upon start-up, the remote telephony device 204 may automatically search for, and connect to, the PBX server 112 by looking for a PBX identifier or IP address which, in some embodiments, is a DNS host name (e.g., the domain name) of the PBX server 112. Accordingly, the remote telephony device 204 will, via the remote router 120, establish a communication path which recurses through a standard DNS infrastructure on the network 106 until it reaches an enhanced DNS server. Based on the requested identifier or DNS host name, the enhanced DNS server provides a current corresponding location (i.e., IP addresses) for the PBX server 112. More details regarding the process for configuring and using the remote telephony device may be found in U.S. patent application Ser. No. 11/506,279, filed Aug. 17, 2006, and entitled "Mobile Use of a PBX System."

In embodiments where the remote telephony device 204 comprises an analog phone, the remote telephony device 204 may make outbound calls, but the calls may not be tracked by the PBX server 112. However, incoming calls directed to a phone number associated with the analog phone may be received and routed through the PBX server 112, thus enabling the PBX server 112 to track the status of the remote telephony device 204 on incoming calls.

A plurality of local and remote client devices 206 and 208 may also be coupled in communication with the HUD server 114. In exemplary embodiments, the client devices 206 and 208 comprise a computer, laptop, or other computing device. Using the client device 206 or 208, the local or remote user may access e-mail and/or chat. In some embodiments, the client devices 206 and 208 may also provide presence management information (e.g., status) to the user based on permissions as will be discussed further below.

While only a single local and remote telephony device 202 and 204 and a single local and remote client device 206 and 208 are shown in FIG. 2, any number of local and remote telephony devices 202 and 204 and local and remote client devices 206 and 208 may be in communication.

In exemplary embodiments, a permissions interface 210 is coupled in communication to the HUD server 114. The permissions interface 210 allows an individual (e.g., the user or an administrator) to set up permissions for access to presence management information provided by the HUD server 114. In some embodiments, the permissions interface 210 is a web-based interface. As such, the individual may provide a password to access the permissions interface 210 from any location that provides web access. For example, the individual may make changes or set up new permissions from home. The permissions may then be saved to a centralized database. Copies of the permissions may then be copied to a permissions database on the HUD server 114. In exemplary embodiments, the permissions are updated to the HUD server 114 in real-time.

In alternative embodiments, the permissions interface 210 may be embodied within the HUD server 114 or be coupled to the HUD server 114. In some of these embodiments, the permissions may be directly written to the permission database in the HUD server 114.

According to one embodiment, permissions may be set based on groups. For example, a group or one or more presence management users may be designated with a group name by an individual (e.g., administrator). Permissions for this group are then established. As such, the group may be able to view extensions of everyone in an executive team and record the calls of everyone in the executive team. However, the group cannot drag calls away from executive team members. All of these permissions/rights over the executive team may be labeled "group permission 1." The group may have a different set of permissions over a sales team. For example, the group may be able to see who is logged in and record calls of every member of the sales team. As such, the permissions/rights over the sales team may be labeled "group permission 2." Any number of group permissions may be established for the group, and any number of groups may have established group permissions.

Additionally, the teams may be established by the individual. Each team may comprise one or more (local and remote) users over whom the presence management user will have rights to view presence management information. The individual may create, name, and add local or remote users to each team. It should be noted that each presence management user may comprise any number of customized teams over whom they have rights to access presence management information.

Figure 3:
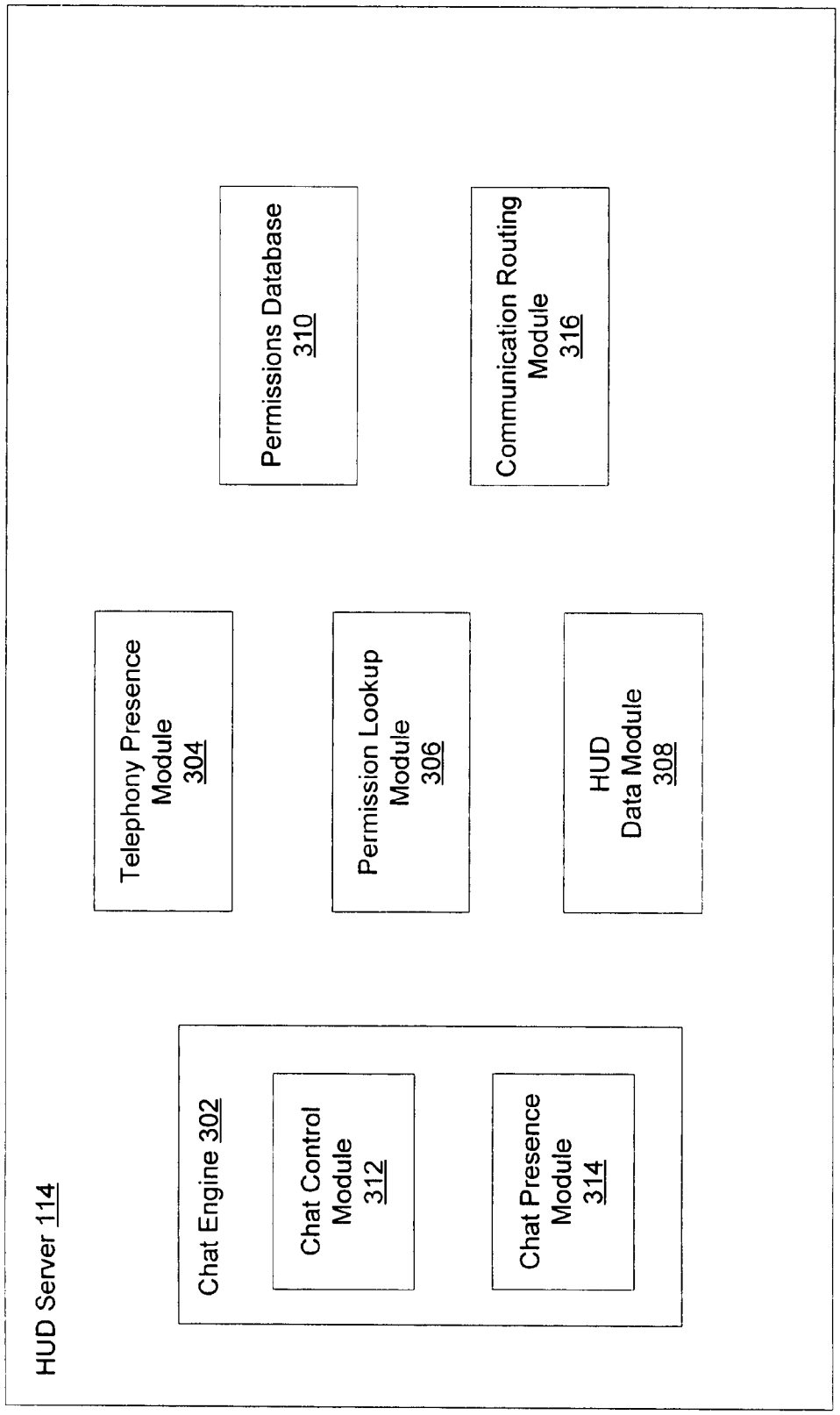
FIG. 3 is a block diagram of a HUD server, according to one embodiment of the present invention.

Referring now to FIG. 3, the exemplary HUD server 114 is shown in more detail. The HUD server 114 may comprise a presence management system and a chat system. Alternative embodiment may separate the presence management and chat functionality into two separate systems that are coupled together in communication. The exemplary HUD server 114 may comprises a chat engine 302, a telephony presence module 304, a permission lookup module 306, a HUD data module 308, and a permissions database 310. Alternative embodiments may comprise more, less, or functionally equivalent engines and modules. For example, additional databases may be provided for storing current and/or past presence management information.

In exemplary embodiments, the HUD server 114 provides a client-server module for chatting. Thus, the exemplary chat engine 302 is enabled to provide chat functionality and determine chat status. In exemplary embodiments, the chat engine 302 comprises a chat control module 312 and a chat presence module 314.

The chat control module 312 receives chat messages from one user and forwards the chat message to one or more other users (e.g., local, remote, or external users). As such, the chat control module 312 controls the exchange of messages between users. For local users, the local client device 206 may exchange chat messages with the chat control module 312 via a local area network (LAN). In contrast, chat messages may be exchanged between the remote client device 208 and the chat control module 312 via the network 106.

Because chat messages pass through the chat control module 312, the chat presence module 314 may be able to easily detect the chat status of some local and remote users. That is, the chat presence module 314 may determine which users are chatting based on chat messages being routed through the chat control module 312. It should be noted that chat may also refer to instant messaging in various embodiments.

The exemplary telephony presence module 304 is configured to maintain the telephony status of local and remote users. Since all telephony calls are directed through the PBX server 112, the PBX server will know the status of telephone devices 202 and 204. In exemplary embodiments, the PBX server 112 will forward telephony status to the telephony presence module 304. In some embodiments, the status may be forwarded periodically (e.g., every 2 minutes), as soon as a change is detected (e.g., a user picks up a line of the telephony device), or continuously in real-time. In other embodiments, the telephony presence module 304 may pull the telephony status from the PBX server 112 periodically or continuously.

In some embodiments, the PBX server 112 may send a packet to the remote telephony device 204 to determine the status of the remote telephony device 204. If, for example, a response to the packet takes more than one second to return to the PBX server 112, the remote telephony device 204 is considered not available. As such, the PBX server 112 polls the remote telephony device 204. The polling may occur periodically or continuously.

The permission lookup module 306 is configured to determine permissions for each presence management user associated with a client device 206 and 208. Ideally, the client devices 206 and 208 are assigned to a specific user and/or the user logs in to utilize the client devices 206 and 208. Based on the user identity and/or login, the permission lookup module 306 will determine the associated permissions, and provide presence management information accordingly.

As previously discussed, the permissions are set up by the permissions interface 210 and stored into the permissions database 310. In exemplary embodiments, the client devices 206 and 208 not only allow their respective users to chat and e-mail, but also to receive and display presence management information. However, the receipt and display of presence management information is dependent on permissions set for each user associated with the client devices 206 and 208. Additionally, the permissions may also determine functionalities provided to the users of the associated client devices 206 and 208 (e.g., barging a call, recording a call, etc.).

The exemplary HUD data module 308 provides presence management information to local and remote client devices 206 and 208 of the presence management user based on permissions associated with each presence management user. The local client device 206 may be directly coupled to the HUD server 114 or be coupled via the router 110 or hub in order to receive presence management information. In contrast, the remote client device 208 may be coupled via the network 106. In some embodiments, the remote client device 208 may utilize a locator service to find the HUD server 114 based on a host name. The presence management information is then displayed utilizing a graphical user interface of the client devices 206 or 208, which allows tracking of local and remote users on a single display/interface.

In some embodiments, the client devices 206 or 208 may also provide alerts to the user via the graphical user interface. For example, a call comes into a telephone associated with a user. The user may take the call, not take the call, sent it to voicemail, record it, look up the caller via a search engine (e.g., Google), or perform a contact match or caller ID lookup using Outlook, Exchange, or other contact storage systems from providers such as sugarCRM or Salesforce.com. These alerts will be received and displayed on the client device 206 or 208 of the user being called. The user may then select an icon representing an action the user would like to perform with respect to the incoming call (e.g., send to voicemail or record it).

In some embodiments, the HUD data module 308 uses logic to determine the appropriate presence management information to provide. For example, if a user has not logged into their client device 206 or 208 and their phone is not registered, then the HUD data module 308 knows that the user is not logged in. However, if the user is on the telephony device 202 or 204, but not logged into their client device 206 or 208, then the user may not have their client device 206 or 208 turned on. Additionally, if the client device 206 or 208 has not registered any mouse or keyboard (i.e., computing device accessory) movement after a certain amount of time, the user may be away from their client device 206 or 208 even through the user is logged in.

An optional communication routing module 316 may also be provided. In some embodiments, the communication routing module 316 is configured to make communication routing decisions based on the presence management information. For example, if the local or remote user has not moved their mouse or keyboard for a predetermined amount of time, the user is marked as unavailable for chat, and possibly for telephone calls to their desk phones (e.g., analog or IP phones). However, call routing may be used to route calls to a mobile phone of the user. Thus, a call to the user's desk phone may be routed to their mobile phone. Similarly, e-mails or chat may be routed to the user's portable computing device instead of a desktop computer.

Figure 4:
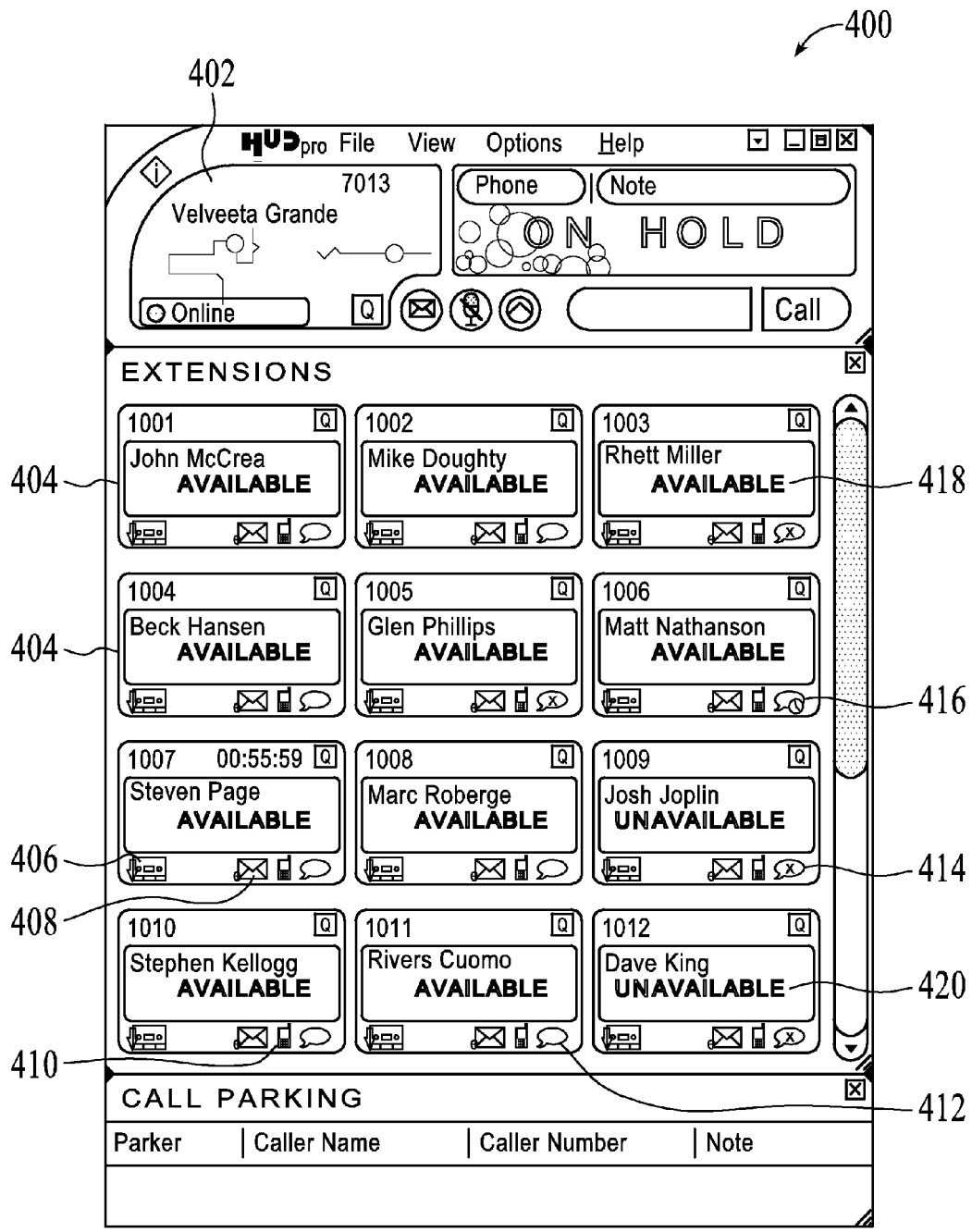
FIG. 4 is an exemplary HUD display showing availability of users.

FIG. 4 is an exemplary HUD display 400 (i.e., graphical user interface) provided by the client devices 206 or 208 showing availability of users. The presence management information of the HUD display 400 may be provided on the client devices 206 or 208 based on the permissions associated with the presence management user of the client devices 206 or 208. In the present example, the presence management user is identified by name and extension in a top, left display section 402. The presence management information (e.g., status) of local and remote users is displayed in a lower portion of the HUD display 400. Each local and remote user is identified by name and extension within a display block 404. The local and remote users may be organized in any manner, such as by first name, last name, extension number, team (e.g., sales teams, executive team) or group, and so forth.

Within each block 404, a plurality of icons may be provided to show availability and/or provide quick functionality. The following examples of icons are exemplary, and alternative embodiments may utilize other forms and types of icons.

Selecting (i.e., clicking on) a tape icon 406 may activate call recording, while selecting an e-mail icon 408 may activate an e-mail template addressed to the user associated with the block 404. A selection of a mobile phone icon 410 may initiate a call to the user's mobile phone. While a phone icon is not shown, the user may activate a call to the local or remote user by, for example, clicking on an extension number within the block 404.

A chat icon may also be provided within each block 404. The status of the user with respect to chat may be indicated based on the condition of the chat icon. For example, a white chat icon 412 indicates that the user is available for chat. When the presence management user clicks on the clear chat icon 412, a chat session will start with the indicated user. An "X"ed-out chat icon 414 may indicate that the user is not available for chat. The user may not be available because the user is not logged into their client device 206 or 208 or the user has indicated that they do not want to chat.

A chat/clock icon 416 may indicate that the user is away. That is, the user is logged in, but may not be currently using their client device 206 or 208. For example, if the user has not moved the mouse or use the keyboard after a predetermined amount of time, an "auto away" feature may activate which may send the away status to the HUD server 114.

Telephony status may be provided based a color of the block 404 and a corresponding message. In one embodiment, available local and remote users may have a block 404 that is colored blue. Additionally, an "available" message 418 may be displayed in the block 404. In contrast, the local or remote user is not available for a telephone call if the block 404 is colored gray, for example. Additionally, an "unavailable" message 420 may be displayed in the block 404. In some embodiments, the local or remote user may actively set themselves to be unavailable for a telephone call.

Figure 5:
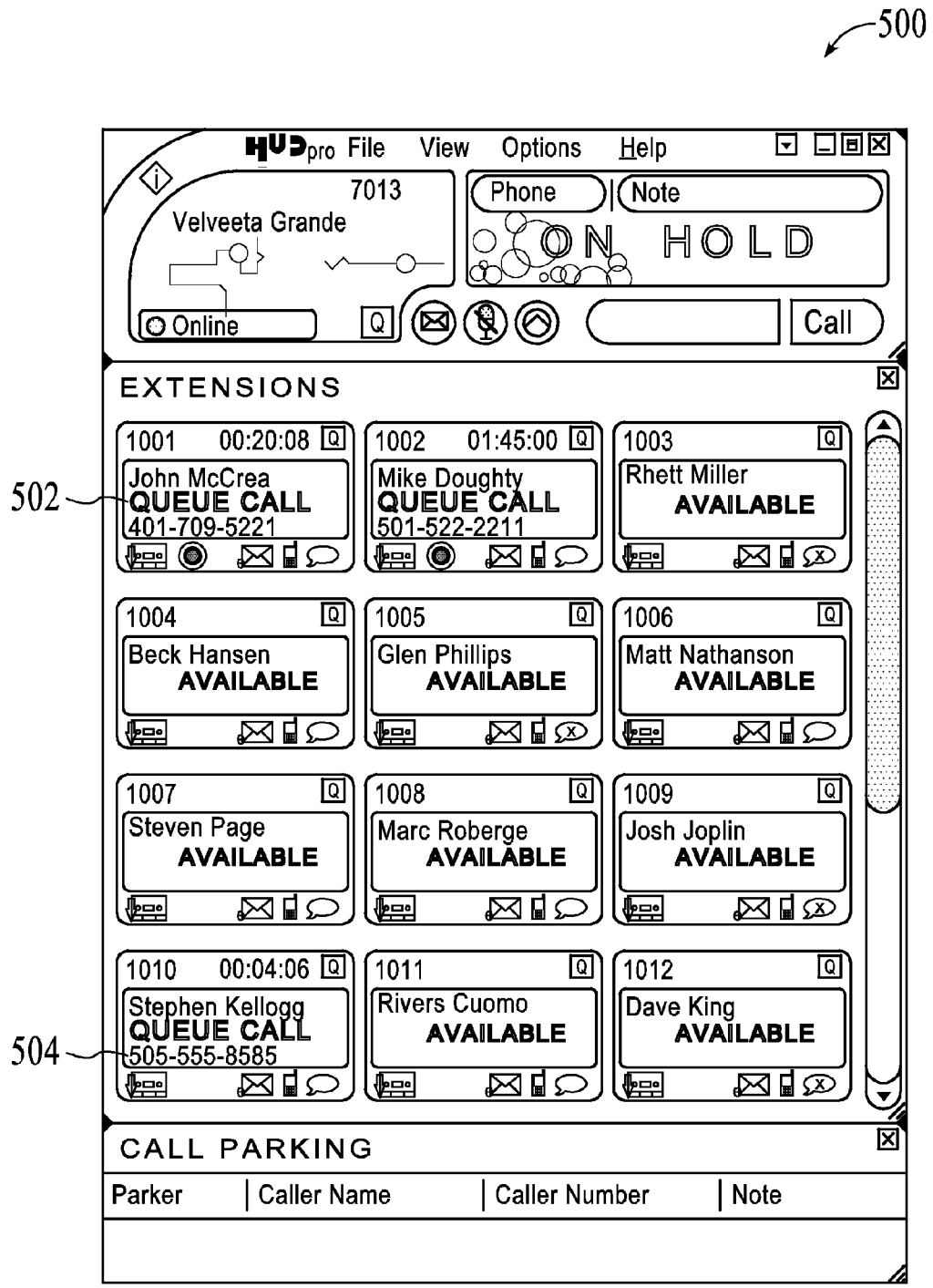
FIG. 5 is an exemplary HUD display showing users on a queue call.

Referring now to FIG. 5, another example of a HUD display 500 is shown. In this example, some local or remote users are on queue calls. A queue call is a call from a queue of incoming calls, typically, to a customer service or sales line (e.g., call center). According to one embodiment, the associated block 404 of the local or remote user may have an orange color and comprises a "queue call" message 502. A phone number 504 of the incoming queue call may also be displayed in the block 404. In some embodiments, an indication of how long the user has been on the queue call may also be provided.

Figure 6:
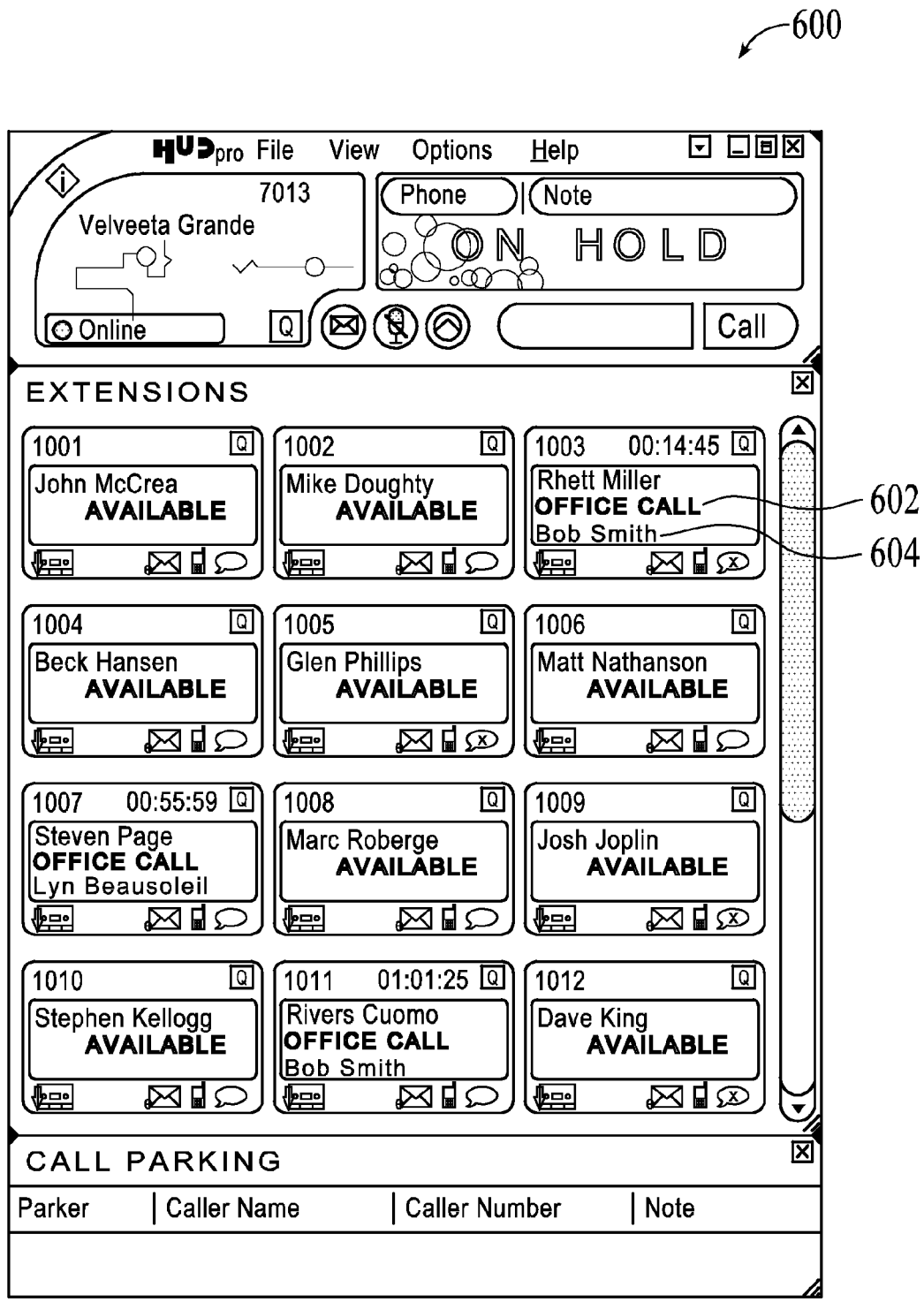
FIG. 6 is an exemplary HUD display showing users on an internal call.

A further example of a HUD display 600 is shown in FIG. 6. In this example, some local and remote users are participating on internal office calls. The block 404 associated with these users may have, for example, a purple color and comprise an "office call" message 602. Additionally, a name 604 of a second party on the call may be display in the block 404. In some embodiments, an indication of how long the users have been on the internal call may also be provided.

Figure 7:
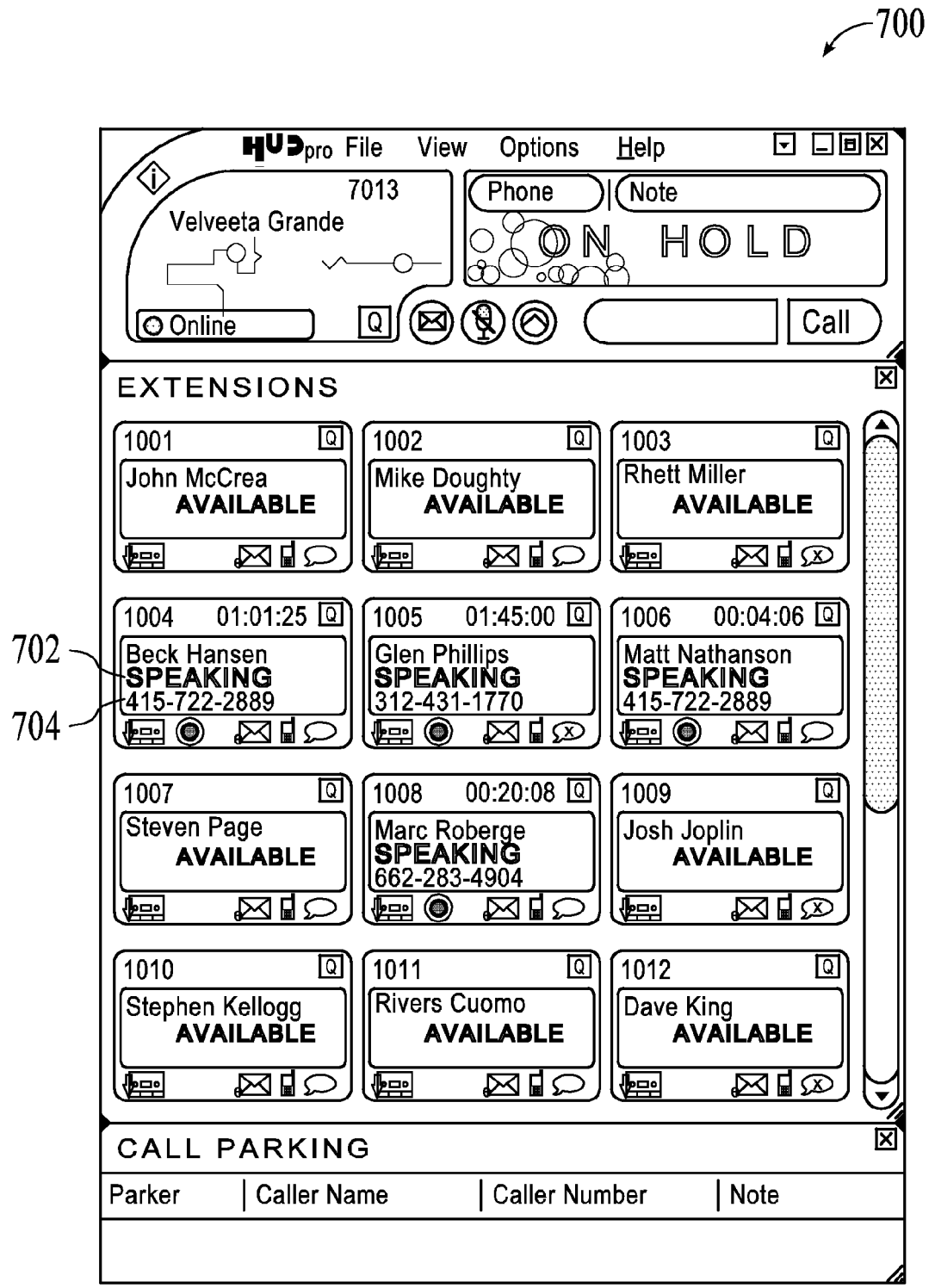
FIG. 7 is an exemplary HUD display showing users on an outbound call.

Referring now to FIG. 7, a further example of a HUD display 700 is provided. In this example, some local and remote users are engaged in outbound calls. In exemplary embodiments, the local and remote user may have dialed these outbound calls. According to one embodiment, the block 404 may comprise a green color and include a "speaking" message 702. Additionally, a phone number 704 of the outbound call may be displayed in the block 404. In some embodiments, an indication of how long the user has been on an outbound call may also be provided.

It should be noted that the colors and messages utilized in the embodiments of FIG. 4-FIG. 7 are exemplary. Alternative embodiments may comprise the user of other colors and messages to indicate similar or same statuses. Additionally, while different call types have been described on different HUD displays, any combination of call types may be found within a single HUD display. In yet other embodiments, the telephony status may be presented using icons (e.g., similar to how chat status is presented).

Figure 8:
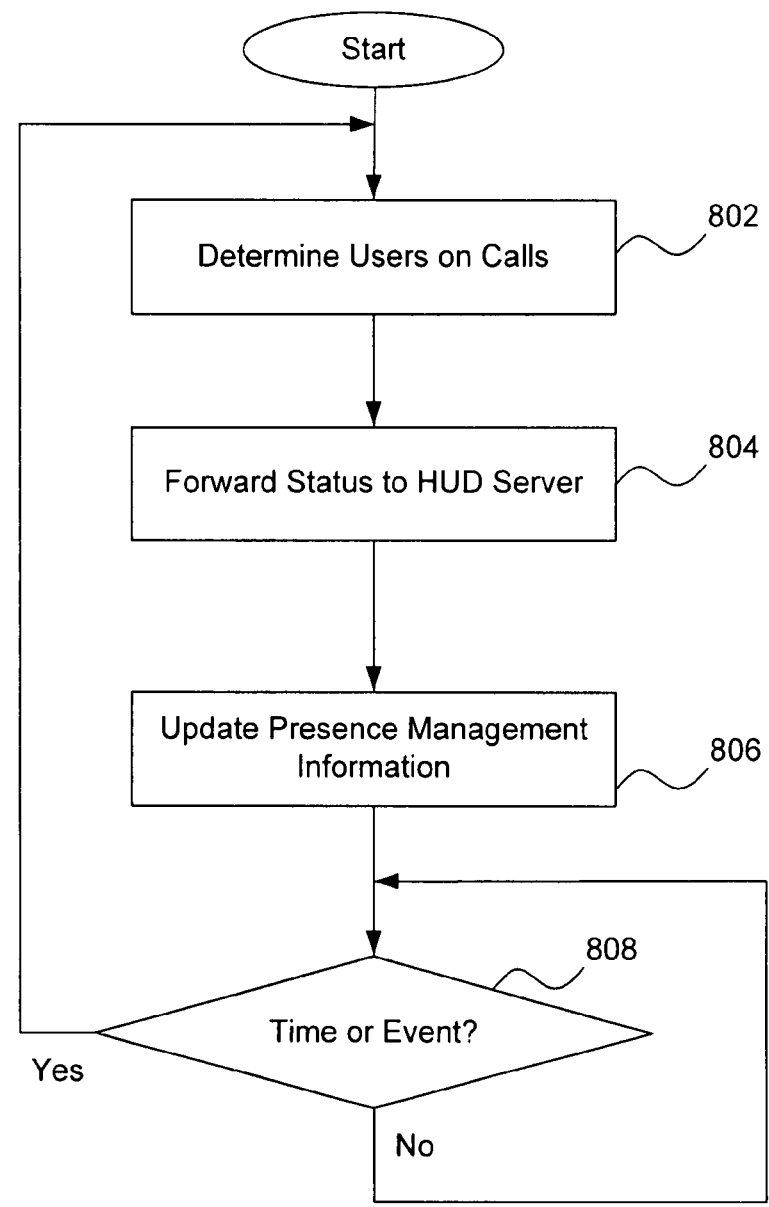
FIG. 8 is a flowchart of an exemplary method for determining telephony status.

Referring now to FIG. 8, a flowchart 800 of an exemplary method for determining telephony status (i.e., presence management information) is shown. In step 802, local and remote users on a telephone call are determined. In exemplary embodiments, the PBX server 112 will know which local users and some remote users (e.g., remote users on IP phones and/or remote users receiving incoming calls routed via the PBX server 112) are on telephone calls since the telephone calls are directed through the PBX server 112. Additionally, the PBX server 112 may maintain a record of all telephony devices 202 and 204 registered with the PBX server 112 and know which telephony devices 202 and 204 are operational (e.g., user is logged in, user turned the telephony device on, etc.).

The telephony status is forwarded to the HUD 112 server 114 in step 804. Thus, the PBX server 112 will forward the current telephony status to the telephony presence module 304. The telephony status may be forwarded in real-time, at predetermine times, or when an event occurs (e.g., when a new telephone call is established, when a telephone call ends, when a telephony device 202 is made operational). In step 806, the presence management information is updated.

After a predetermined period of time or an event occurs in step 808, the telephony statuses of the users are determined again. In some embodiments, the predetermined period of time is continuous (i.e., real-time). The event may comprise a new telephone call, an end to a telephone call, activation of telephony devices 202 and 204, and so forth.

Figure 9:
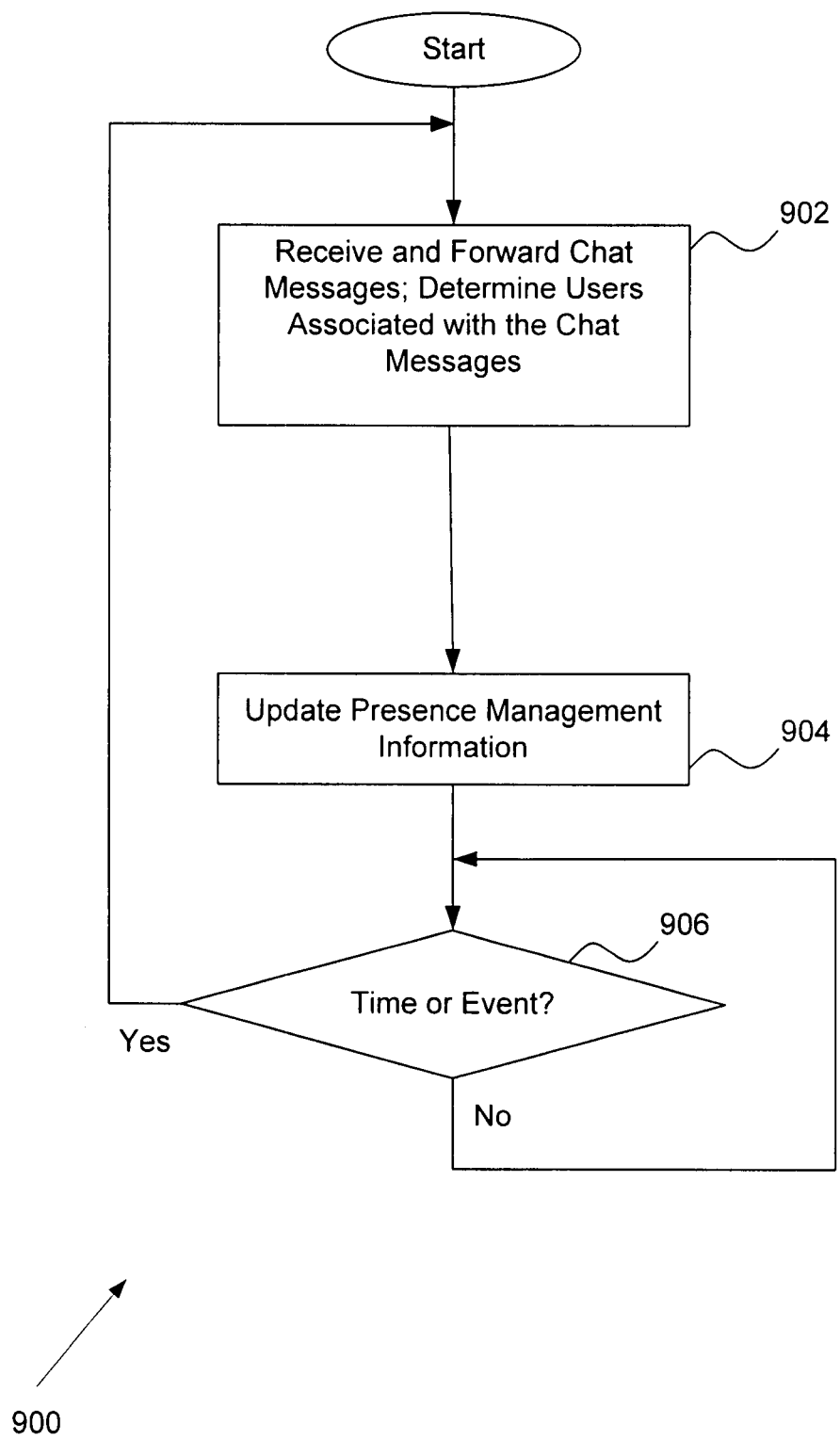
FIG. 9 is a flowchart of an exemplary method for determining chat status.

Referring now to FIG. 9, a flowchart 900 of an exemplary method for determining chat status (i.e., presence management information) is shown. In step 902, chat messages are received by the chat control module 312 from senders. The chat control module 312 then forwards the chat messages on to their respective recipients. The senders and recipients associated with the chat messages are also determined.

The chat status is updated by the chat presence module 314 in step 904. In exemplary embodiments, chat status may comprise available, not available, and away.

After a predetermined period of time or an event occurs in step 906, the chat statuses of the users are determined again. In some embodiments, the predetermined period of time is continuous (i.e., real-time). The event may comprise a new chat session or an end to a chat session, for example.

Figure 10:
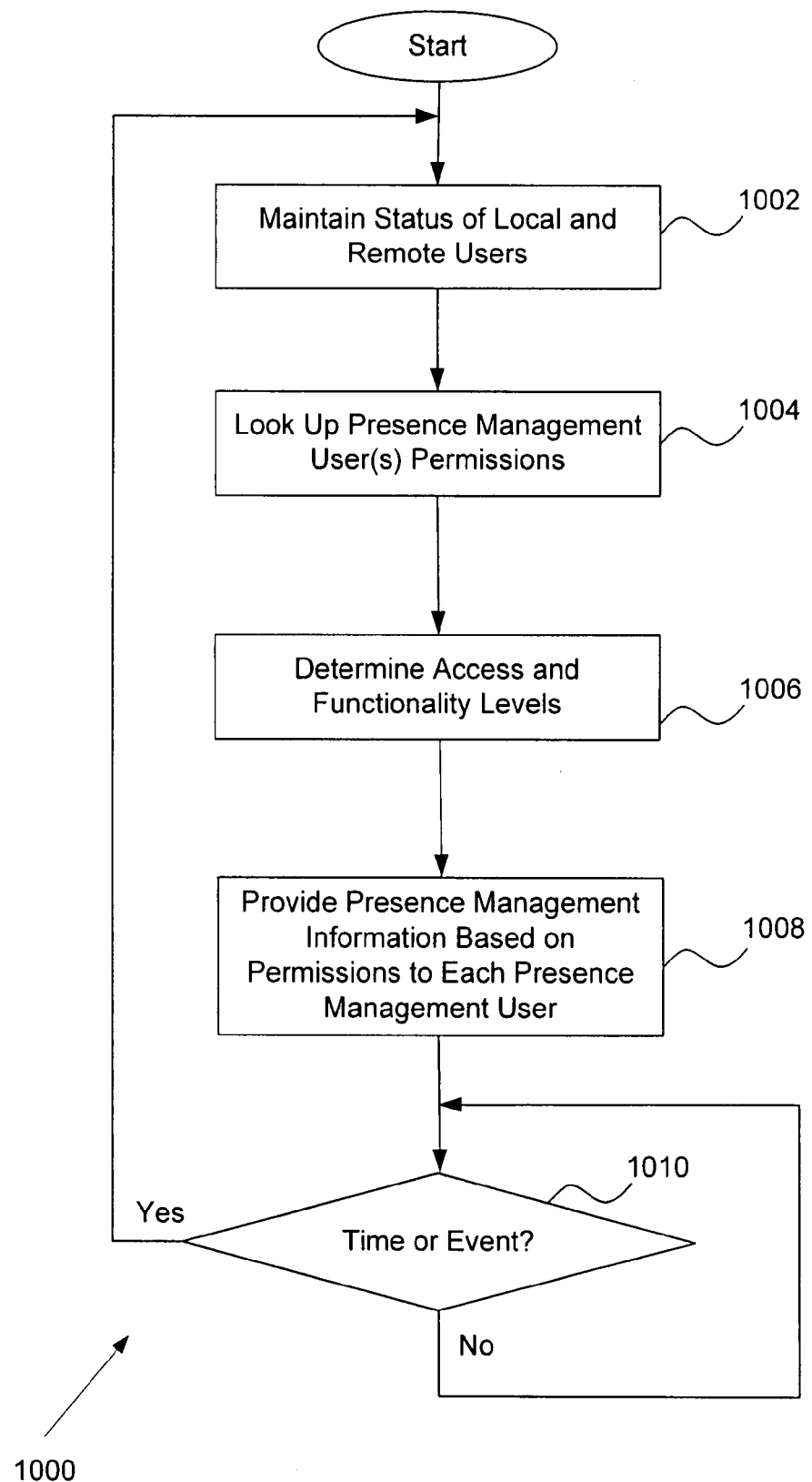
FIG. 10 is a flowchart of an exemplary method for providing presence management information of local and remote users to a client device.

Referring now to FIG. 10, a flowchart 1000 of an exemplary method for providing presence management information (e.g., telephony and chat status) to presence management users is shown. In step 1002, the presence management information is maintained and updated. In exemplary embodiments, the HUD server 114 will receive real-time telephony status from a PBX server 112, and determine chat status based on chat messages routed through the HUD server 114 as described in connection with FIG. 8 and FIG. 9.

In step 1004, permissions are determined for each presence management user currently active (e.g., logged in). In exemplary embodiments, the permission lookup module 306 reviews permissions stored in the permissions database 310 for each presence management user.

Based on the lookup, a proper level of access and functionality is determined for each presence management user with respect to each local and remote user in step 1006. The permissions define which group of one or more users each presence management user has authority to view presence management information for as well as a level of access for that information. Additionally, the permissions may define a level of functionality the presence management user has with respect to interacting with each local and remote user based on the presence management information. Thus, for example, some presence management users may be able to view telephony status for the sales team and executive team, but can only barge (i.e., listen in) telephone calls of the sales team, while another presence management user may only view the telephony status of the sales teams.

Based on the determination in step 1006, appropriate presence management information is provided to each active presence management user in step 1008. The presence management information may be provided via a graphical user interface which presents the information for both local and remote users. In exemplary embodiments, the presence management information comprises telephony status and chat status.

After a predetermined period of time or an event occurs in step 1010, the statuses of the local and remote users are determined again. In some embodiments, the predetermined period of time is continuous (i.e., real-time). The event may comprise a start or end of a chat session, a start or end of a telephone call, activation of new telephony devices 202 and 204 or client devices 206 and 208, for example.

Figure 11:
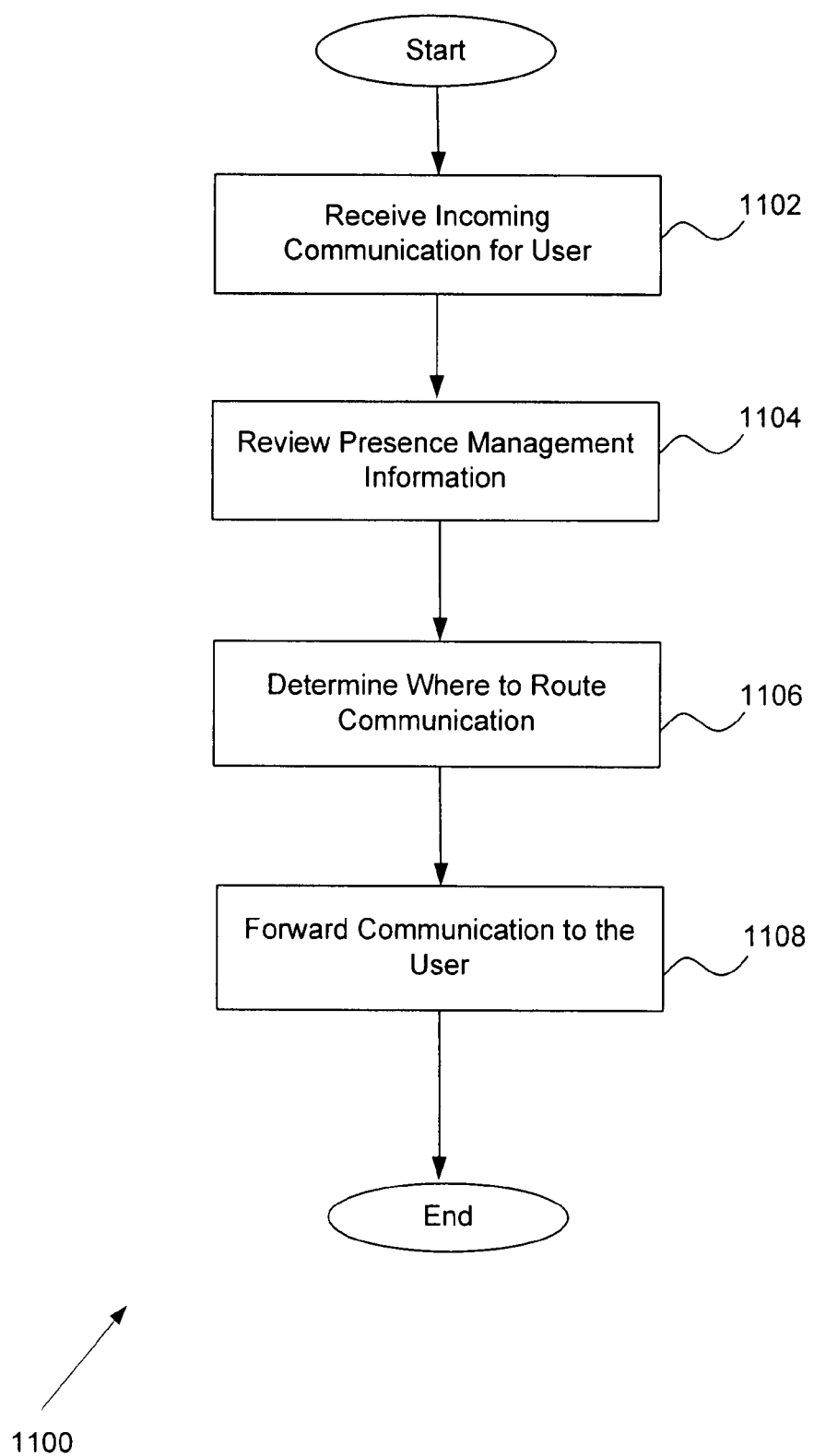
FIG. 11 is a flowchart of an exemplary method for communication routing.

Referring now to FIG. 11, a flowchart 1100 of an exemplary method for communication routing is shown. In step 1102, an incoming communication for a particular user is received. If the communication is a phone call, the communication is received by the PBX server 112. If the communication comprises a chat message, then the communication is received by the HUD server.

The HUD server 114 (e.g., the HUD data module 308) reviews the presence management information in step 1104. The presence management information may indicate if the user is currently on a call or chatting. Additionally, the presence management information may also indicate if the user may be away from their desk (e.g., away from their telephony device and client device) or generally unavailable.

Based on the presence management information, the communication routing module 316 may determine where to route the communication in step 1106. For example, if the user has not moved their mouse or keyboard for more than a predetermined amount of time, the user is probably not available for chat or calls to their desk devices (e.g., desktop client device or desk phone). Therefore, the communication routing module 316 may determine that the incoming chat messages and/or phone calls should be forwarded to the user's mobile device. In step 1108, the incoming communication is forwarded to the proper device associated with the user.

While embodiments of the present invention have been described with respect to local and remote users of a main office, alternative embodiments may be applied to users in general. In exemplary embodiments, a user may add contacts (e.g., friends, family, co-workers, etc.) to a version of a HUD server 114 (e.g., a localized HUD server within their computer devices). Once added, the user may view their contacts on a HUD display (i.e., graphical user interface) similar to the displays illustrated in FIG. 4-FIG. 7, for example. As such, the telephony and chat status of any contacts may be viewed on a centralized display. If the user desires to contact a particular contact, the user may click on a phone, mobile phone, e-mail, or a chat icon and commence communication (e.g., Google Talk, Skype, etc.). Additionally, the chat status of these contacts may also be monitored by the user via the same HUD display. It should be noted that access to contact status may be based on permissions granted to the user by the contacts.

The above-described components and functions can be comprised of instructions that are stored on a computer-readable or machine-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A system for managing presence of local and remote users, comprising:
a permissions interface configured to set up permissions for at least one presence management user, the permissions determining an amount of access to presence management information of each local and remote user and determining whether communication content monitoring is enabled, wherein permissions may be set based on groups;
at least one communication presence module configured to monitor communication statuses of the local and remote users, the at least one communication presence module comprising a telephony presence module that receives telephony status from a Private Branch Exchange (PBX) server; and
a data module configured to provide presence management information of the local and remote users based on the permissions to the presence management user, the presence management information provided for at least one user comprising a plurality of communication statuses.

2. The system of claim 1 wherein the at least one communication presence module comprises a chat presence module.

3. The system of claim 1 wherein the presence management user comprises the local user or the remote user.

4. The system of claim 1 wherein the permissions interface comprises a web-based permissions interface.

5. The system of claim 1 wherein the presence management information comprises availability of the local and remote users for communication.

6. The system of claim 5 wherein the communication comprises a phone call or a chat session.

7. The system of claim 1 further comprising a communication routing module configured to route communications based on the presence management information.

8. The system of claim 1 wherein the plurality of communication statuses comprises a telephony status and a chat status.

9. The system of claim 1 wherein the permissions further determine whether communication recording is enabled.

10. A method for managing presence of local and remote users, comprising:
determining presence management information for the local and remote users;
reviewing permissions established for at least one presence management user to determine an amount of access to the presence management information of each local and remote user, the permissions determining whether communication content monitoring is enabled, wherein permissions may be set based on groups; and providing the presence management information of the local and remote user based on the permissions to the presence management user, the presence management information provided for at least one user comprising a plurality of communication statuses monitored by at least one communication presence module, the at least one communication presence module comprising a telephony presence module that receives telephony status from a Private Branch Exchange (PBX) server.

11. The method of claim 10 wherein determining communication status comprises determining telephony status of the local and remote users.

12. The method of claim 11 further comprising receiving the telephony status from a Head-Up Display (HUD) server.

13. The method of claim 10 wherein determining communication status comprises determining chat status of the local and remote users.

14. The method of claim 10 wherein the presence management user comprises the local user or the remote user.

15. The method of claim 10 further comprising establishing the permissions for each presence management user.

16. The method of claim 15 wherein establishing the permissions comprises utilizing a web-based permissions interface.

17. The method of claim 10 further comprising receiving the permissions and updates to the permissions and storing the permissions in a database.

18. The method of claim 10 further comprising routing communications based on the presence management information.

19. The method of claim 10 further comprising determining presence management information based on movement of computing device accessories.

20. A non-transitory machine readable storage medium having embodied thereon a program, the program providing instructions for a method for managing presence of local and remote users, the method comprising:

determining presence management information for the local and remote users;

reviewing permissions established for at least one presence management user to determine an amount of access to the presence management information of each local and remote user, the permissions determining whether communication content monitoring is enabled, wherein permissions may be set based on groups; and providing the presence management information of the local and remote user based on the permissions to the presence management user, the presence management information provided for at least one user comprising a plurality of communication statuses monitored by at least one communication presence module, the at least one communication presence module comprising a telephony presence module that receives telephony status from a Private Branch Exchange (PBX) server.

\* \* \* \* \*

UNITED STATES PATENT AND TRADEMARK OFFICE
CERTIFICATE OF CORRECTION

| | | |
|---|---|---|
| PATENT NO. | : 8,693,659 B2 | Page 1 of 1 |
| APPLICATION NO. | : 11/827314 | |
| DATED | : April 8, 2014 | |
| INVENTOR(S) | : Lyman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this
Eleventh Day of August, 2015

Michelle K. Lee
*Director of the United States Patent and Trademark Office*